United States Patent [19]
Adler et al.

[11] Patent Number: 5,963,152
[45] Date of Patent: Oct. 5, 1999

[54] RESOLVING BLOCK METHOD FOR SYNCHRONIZATION CORRECTION IN RUN-LENGTH LIMITED CODES

[75] Inventors: Roy Lee Adler, Chappaqua, N.Y.; Martin Aureliano Hassner, Mountain View, Calif.; Bruce Kitchens, Mount Kisco, N.Y.

[73] Assignee: International Business Machines Corporation, Armonk, N.Y.

[21] Appl. No.: 08/987,208

[22] Filed: Dec. 9, 1997

[51] Int. Cl.⁶ ................................................ H03M 13/00
[52] U.S. Cl. ................................................. 341/59; 341/94
[58] Field of Search ................................ 341/50, 58, 59, 341/94

[56] References Cited

U.S. PATENT DOCUMENTS

| | | | |
|---|---|---|---|
| 4,833,470 | 5/1989 | Iketani | 341/59 |
| 5,220,568 | 6/1993 | Howe et al. | 371/37.1 |
| 5,623,477 | 4/1997 | Shimada et al. | 369/275.3 |
| 5,682,153 | 10/1997 | Ishiguro | 341/53 |
| 5,815,514 | 9/1998 | Gray | 371/42 |

*Primary Examiner*—Marc S. Hoff
*Attorney, Agent, or Firm*—Whitham, Curtis & Whitham; Steven C. Kaufman

[57] ABSTRACT

An efficient method and apparatus corrects synchronization problems in the recovery data stored on magnetic media. Resolving blocks are inserted into the unconstrained data string at specified intervals. A resolving block is constructed to do two things: reset the encoding automaton and produce in the constrained data string blocks which allow correction of synchronization. Before decoding, synchronization is corrected. The constrained data string is decoded, and then the resolving block removed. The blocks are inserted before run-length limited encoding occurs and deleted after run-length limited decoding takes place. The run-length limited encoder and decoder are unchanged.

12 Claims, 2 Drawing Sheets

RESOLVING BLOCK METHOD FOR SYNCHRONIZATION CORRECTION IN RUN-LENGTH LIMITED CODES

BACKGROUND OF THE INVENTION

1. Field of the Invention

The present invention generally relates to run-length limited codes or any finite memory code. The invention is an efficient method for correcting synchronization problems in the recovery of data stored on magnetic or optical media.

2. Background Description

Run-length limited codes are used in many magnetic and optical recording applications. A run-length limited code converts an unconstrained string of data bits into a run-length constrained string which can he more efficiently stored or transmitted. A run-length limited code has a rate which is expressed as a fraction, p/q. This means the encoder converts blocks of p unconstrained bits into blocks of q constrained bits. After passing through the channel, the decoder recovers the blocks of p data bits from the blocks of q constrained bits.

The recovery of data stored on magnetic media is subject to two kinds of errors: incorrectly read bits and loss of synchronization. Incorrectly read bits are corrected by error correcting schemes such as the Reed-Solomon code in which data is passed through an error correcting encoder before channel encoding and decoded after channel decoding. However, if the string of bits entering the channel and the string of bits emerging from the channel are not synchronized, the decoder will be looking across q blocks of constrained bits and will decode the string incorrectly. All subsequently read data is entirely corrupted and will totally defeat the error correcting decoder. The problem is to find an efficient method to correct synchronization problems.

SUMMARY OF THE INVENTION

It is therefore an object of the present invention to provide an efficient method and apparatus for correcting synchronization problems in the recovery data stored on magnetic or optical media.

According to the invention, resolving blocks are inserted into the unconstrained data string at specified intervals. A resolving block is constructed to do two things: reset the encoding automaton and produce in the constrained data string blocks which allow correction of synchronization. Before decoding, synchronization is corrected. The constrained data string is decoded, and then the resolving block removed. The blocks are inserted before run-length limited encoding occurs and deleted after run-length limited decoding takes place. The run-length limited encoder and decoder are unchanged.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
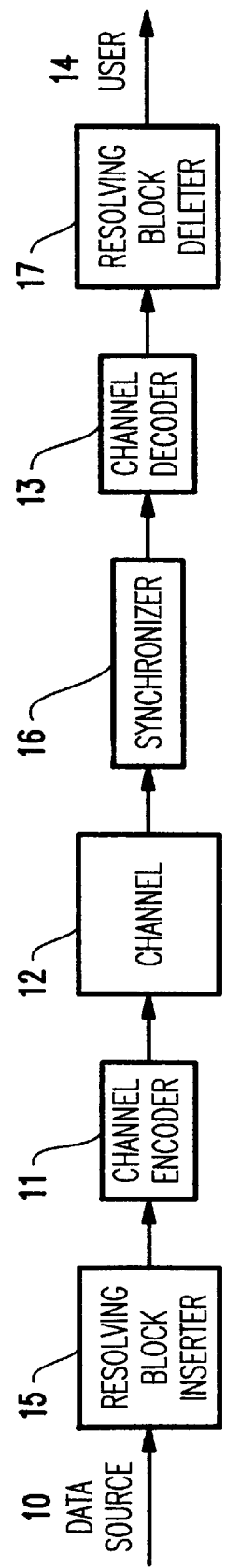
FIG. 1 is a block diagram of a data storage channel in which the invention may be implemented.

Referring now to the drawings, and more particularly to FIG. 1, there is shown a block diagram of a data storage channel of the type in which the present invention may be implemented. More specifically, data from a data source 10 is input to a channel encoder 11 which outputs encoded data to channel 12. The encoder is implemented as a finite state automaton, an example of which is disclosed in U.S. Pat. No. 4,413,251 to Adler et al. The encoded data is run-length limited data, and the channel 12 may be a magnetic recording media to which the encoded data is written. The encoded data is read out of the channel 12 (e.g., the magnetic or optical media) and into the channel decoder 13 to recover the input data which is output to user 14. The user 14 may be, for example, a computer system.

The system thus far described represents the current state of the prior art. The present invention adds three new components to this basic system. They are the resolving block inserter 15, the synchronizer 16 and the resolving block deleter 17. First, before the input data is sent to the channel encoder 11, resolving blocks are inserted into the input data by resolving block inserter 15. These resolving blocks are used to establish correct synchronization in the synchronizer 16. Finally, after the input data is recovered by the channel decoder 13, the resolving blocks are deleted by the resolving block deleter 17.

Data emerging from the channel 12 is subject to two types of errors, bit and slip errors. We define a 1 bit error to be a 0 changed to a 1, a 1 changed to a 0, or a 1 transposed with an adjacent 0. We define an n-slip error to be an n time step synchronization difference between the encoded constrained string entering the channel and the string emerging from the channel.

Bit errors are dealt with by an error-correction encoder/decoder, the details of which are not shown here. This invention is concerned with slip errors in the presence of bit errors. We shall discuss this invention for the Adler, Hassner, Missouris (1,7) code (see U.S. Pat. No. 4,413,251) and the Franaszek (2,7) code (see U.S. Pat. No. 3,689,899).

(1,7) Code

The functions in the channel encoder 11 for the (1,7) code are given by the following diagram where the input is two binary bits with transitions state→next state/output in which the output is three binary bits, and the state is A, B, C, D, or E.

| input = | 00 | 01 | 10 | 11 |
|---|---|---|---|---|
| A→ | A/010 | B/010 | C/010 | D/010 |
| B→ | A/001 | B/001 | E/001 | E/010 |
| C→ | A/100 | B/100 | C/100 | D/100 |
| D→ | A/101 | B/101 | E/101 | E/100 |
| E→ | A/000 | B/000 | C/000 | D/000 |

Observe that the block 00 resets the automaton to state A, and the block 01 resets the automation to state B. The following tableaux shows inputs of resolving blocks with different slip correction abilities.

The following resolving block produces an encoded (1,7) constrained block which corrects up to 2-slip errors in the presence of no bit errors.

| resolving block | 01 | 11 | — |
| --- | --- | --- | --- |
| encoded block | — | 010 | 000 |

The following resolving block produces an encoded (1,7) constrained block which corrects up to 5-slip errors in the presence of no bit errors. In addition it will correct up to 2-slip errors in the presence of up to one bit error.

| resolving block | 01 | 10 | 01 | 00 | — |
| --- | --- | --- | --- | --- | --- |
| encoded block | — | 001 | 000 | 001 | 010 |

The following resolving block produces all encoded (1,7) constrained block which corrects up to 4-slip errors in the presence of no more than one bit error.

| resolving block | 00 | 11 | 11 | 01 | 00 | 00 | — |
| --- | --- | --- | --- | --- | --- | --- | --- |
| encoded block | — | 010 | 100 | 000 | 001 | 010 | 010 |
| (2,7) code | | | | | | | |

(2,7) Code

The functions in the channel encoder for the (2,7) code are given by the following diagram where the input is one binary bit with a look-ahead of two binary bits, with transitions state→next state/output in which the output is two binary bits, and the state is A, B or C. For this encoder, the data string is first padded by 00 and the encoder begins in state B.

| input = | 0.00 | 0.01 | 0.10 | 0.11 | 1.0– | 1.1– |
| --- | --- | --- | --- | --- | --- | --- |
| A→ | B/00 | A/00 | B/10 | B/00 | A/00 | B/10 |
| B→ | C/01 | C/01 | B/10 | B/00 | C/01 | C/10 |
| C→ | A/00 | A/00 | B/00 | B/00 | A/00 | B/00 |

Observe that the blocks 0.10 and 0.11 both reset the automation to state B. Using this we can produce slip correcting blocks just as in the (1,7) example.

Embodiment

Using the statistics of known errors of the channel, the designer sets three parameters:

number of slip errors to be corrected;

bit error tolerance; and frequency of resynchronization.

A resolving block is chosen to correct the specific number of slip errors within the specified bit error tolerance. The resolving block is inserted into the data string at regular intervals specified by the resynchronization frequency. This is done by the resolving block insert 15 of FIG. 1. The encloser 11 converts the data string into a constrained one and converts the resolving block into a specific synchronizing block at a specific location. The constrained string passes through the channel 12. The synchronizer 16 expects the synchronizing block to occur at a specific location. If a slip error has occurred, within the bit and slip error tolerance, then the synchronizer 16 detects and corrects the slip error. The decoder 13 converts the constrained string back into a data string. The resolving block deleter 17 removes the resolving blocks at their specified locations.

EXAMPLE

Figure 2:
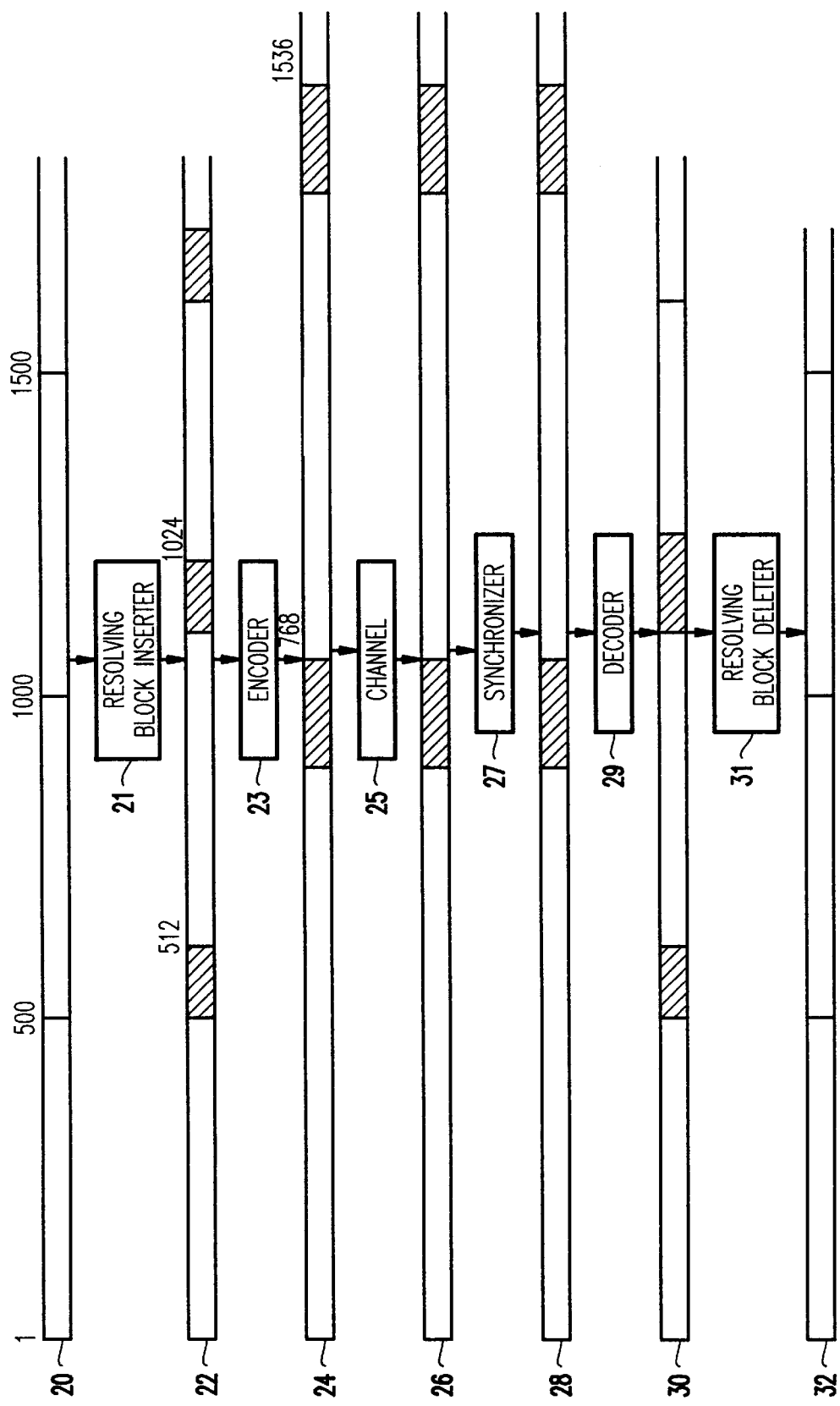
FIG. 2 is a flow diagram illustrating the operation of the method according to the invention.

A specific example is given with reference to FIG. 2. Here we use the (b 1,7) run-length code which has rate 2:3. It is determined that up to four slip errors are to be corrected in the presence of no more than one bit error, and the resynchronization frequency is once every 512 bits. The resolving block is fixed to be the following twelve bits: 00 11 11 01 00 00.

The data string 20 is shown as divided into increments of 500 bits. The resolving block inserter inserts the resolving block at 21 into the data string 20 after every 500 data bits. The resulting 512 bits, indicated at 22 in FIG. 2, are converted into 768 constrained bits 24 by the encoder at 23. The resolving block is converted into the synchronizing block XXX 010 100 000 001 010 010. After passing through the channel 25, the received data string 26 is input to the synchronizer at 27. The synchronizer expects this block at the end of every block of 768 constrained bits, as indicated at 26 and 28 in FIG. 2. If the block is out of synchronization by no more than four bits and there is no more than a one bit error, the synchronizer resynchronizes the string which it is able to do because of the way the synchronizing block was chosen. After decoding, at 30 in FIG. 2, the resolving block deleter removes the final twelve bits of each block of length 512 of unconstrained bits at 31, restoring the data string to that of the source 20, as represented by 32.

While the invention has been described in terms of a single preferred embodiment applied to two different types of run-length limited codes, those skilled in the art will recognize that the invention can be practiced with modification within the spirit and scope of the appended claims.

Having thus described our invention, what we claim as new and desire to secure by Letters Patent is as follows:

1. A method to correct synchronization problems in channel codes generated by an encoder implemented as a finite state automaton comprising the steps of:

inserting resolving blocks into an unconstrained data string at specified intervals, the resolving blocks being chosen to reset the automaton and produce in a constrained data string blocks which allow correction of synchronization;

encoding the unconstrained data string with the inserted resolving blocks to generate a channel constrained data string containing the synchronizing blocks at specific locations;

passing the constrained data string through a channel;

using the synchronizing blocks to insure correct synchronization;

decoding the synchronized and constrained data string to recover the original unconstrained data string with resolving blocks; and deleting the resolving blocks from the recovered unconstrained data string.

2. The method of claim 1 further comprising the step of dividing the unconstrained data string into equal size blocks before the step of inserting the resolving blocks.

3. The method of claim 2 wherein the step of inserting the resolving blocks is performed at the end of each of the equal size blocks.

4. The method of claim 1 wherein the step of encoding is performed by a channel encoder and passing the unconstrained data string containing the resolving blocks through the channel encoder resets the encoder automaton into a prescribed state and causes a synchronizing block to occur in the constrained data string at specified locations.

5. The method of claim 1 further comprising the step of detecting a loss of synchronization in the presence of bit errors after the encoded data string has passed through the channel.

6. The method of claim 1 wherein the step of using the synchronizing blocks to insure correct synchronization resynchronizes the constrained string in the presence of bit errors after the constrained string has passed through the channel.

7. The method of claim 1 wherein the channel codes are run-length limited codes.

8. A communication channel with synchronization correction comprising:

a resolving block inserter inserting resolving blocks into an unconstrained data string at specified intervals;

a channel encoder implemented as a finite state automaton, the resolving blocks being chosen to reset the automaton and produce in a constrained data string blocks which allow correction of synchronization, said encoder encoding the unconstrained data string with the inserted resolving blocks to generate a channel constrained data string containing the synchronizing blocks at specific locations;

a channel though which the constrained data string is passed;

a synchronizer receiving the constrained data string from the channel and using the synchronizing blocks to insure correct synchronization;

a decoder connected to the synchronizer and decoding the synchronized and constrained data string to recover the original unconstrained data string with resolving blocks; and a resolving block deleter deleting the resolving blocks from the recovered unconstrained data string.

9. The communication channel with synchronization correction of claim 8 further comprising means to divide the unconstrained data string into equal block sizes, the inserter inserting resolving blocks into the unconstrained data strings at an end of each of the equal size blocks.

10. The communication channel with synchronization correction of claim 8 wherein passing the unconstrained data string containing the resolving blocks through the channel encoder resets the encoder automaton into a prescribed state and causes a synchronizing block to occur in the constrained data string at specified locations.

11. The communication channel with synchronization correction of claim 8 wherein the synchronizer detects a loss of synchronization in the presence of bit errors after the encoded data string has passed through the channel.

12. The communication channel with synchronization correction of claim 8 the channel codes are run-length limited codes.

* * * * *